(12) United States Patent
Machida et al.

(10) Patent No.: US 8,405,599 B2
(45) Date of Patent: Mar. 26, 2013

(54) IMAGE DISPLAY MEDIUM, DRIVE DEVICE FOR IMAGE DISPLAY MEDIUM AND IMAGE DISPLAY DEVICE

(75) Inventors: Yoshinori Machida, Kanagawa (JP); Satoshi Tatsuura, Kanagawa (JP); Masaaki Abe, Kanagawa (JP); Daisuke Nakayama, Kanagawa (JP); Yoshinori Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 899 days.

(21) Appl. No.: 12/186,274

(22) Filed: Aug. 5, 2008

(65) Prior Publication Data

US 2009/0153943 A1 Jun. 18, 2009

(30) Foreign Application Priority Data

Dec. 14, 2007 (JP) ................................. 2007-323060

(51) Int. Cl.
G09G 3/34 (2006.01)
(52) U.S. Cl. ........................................ 345/107; 359/296
(58) Field of Classification Search .................. 345/107; 359/296
See application file for complete search history.

(56) References Cited

U.S. PATENT DOCUMENTS

| | | | |
|---|---|---|---|
| 6,407,763 B1 | 6/2002 | Yamaguchi et al. | |
| 6,411,316 B1* | 6/2002 | Shigehiro et al. | 347/112 |
| 7,139,114 B2* | 11/2006 | Schmitz et al. | 359/296 |
| 7,414,777 B2* | 8/2008 | Machida et al. | 359/296 |
| 7,663,582 B2* | 2/2010 | Schmitz et al. | 345/84 |
| 2008/0117165 A1* | 5/2008 | Machida et al. | 345/107 |

FOREIGN PATENT DOCUMENTS

| | | |
|---|---|---|
| JP | A-2000-258805 | 9/2000 |
| JP | A-2001-312225 | 11/2001 |
| JP | A-2006-058901 | 3/2006 |
| JP | A-2006-215473 | 8/2006 |
| JP | A-2006-343457 | 12/2006 |
| JP | A-2007-140110 | 6/2007 |
| JP | A-2007-219005 | 8/2007 |
| JP | A-2007-240757 | 9/2007 |
| WO | WO 99/10767 | 3/1999 |
| WO | WO 99/10768 | 3/1999 |
| WO | WO 99/10769 | 3/1999 |

OTHER PUBLICATIONS

Mar. 9, 2010 Office Action issued in corresponding Japanese Patent Application No. 2007-323060 (with translation).

* cited by examiner

*Primary Examiner* — Jimmy H Nguyen (74) *Attorney, Agent, or Firm* — Oliff & Berridge, PLC (57) ABSTRACT

An image display medium comprising a pair of substrates, at least one of which is light-transmissive; two or more kinds of particles having different colors and charge polarities, the particles being positioned between the pair of substrates such that the particles can move in response to an electric field generated between the pair of substrates; and an electric charge-retention layer provided at a side of at least one of the pair of substrates.

15 Claims, 7 Drawing Sheets

IMAGE DISPLAY MEDIUM, DRIVE DEVICE FOR IMAGE DISPLAY MEDIUM AND IMAGE DISPLAY DEVICE

CROSS-REFERENCE TO RELATED APPLICATION

This application is based on and claims priority under 35 USC 119 from Japanese Patent Application No. 2007-323060 filed Dec. 14, 2007.

BACKGROUND

1. Technical Field

The present invention relates to an image display medium, a drive device for the image display medium, and an image display device.

2. Related Art

Conventionally, as an image display medium using electrophoresis, an image display medium using colored particles, and an image display medium using liquid crystals having a memory function and the like have been proposed as an image display medium having a rewritable memory function.

SUMMARY

According to an aspect of the invention, there is provided an image display medium comprising: a pair of substrates, at least one of which is light-transmissive; two or more kinds of particles having different colors and charge polarities, the particles being positioned between the pair of substrates such that the particles can move in response to an electric field generated between the pair of substrates; and an electric charge-retention layer provided at a side of at least one of the pair of substrates.

BRIEF DESCRIPTION OF THE DRAWINGS

Exemplary embodiments of the present invention will be described in detail based on the following figures, wherein.

DETAILED DESCRIPTION

Hereinafter, the present invention will be described with reference to the drawings in detail.

First Embodiment

Figure 1:
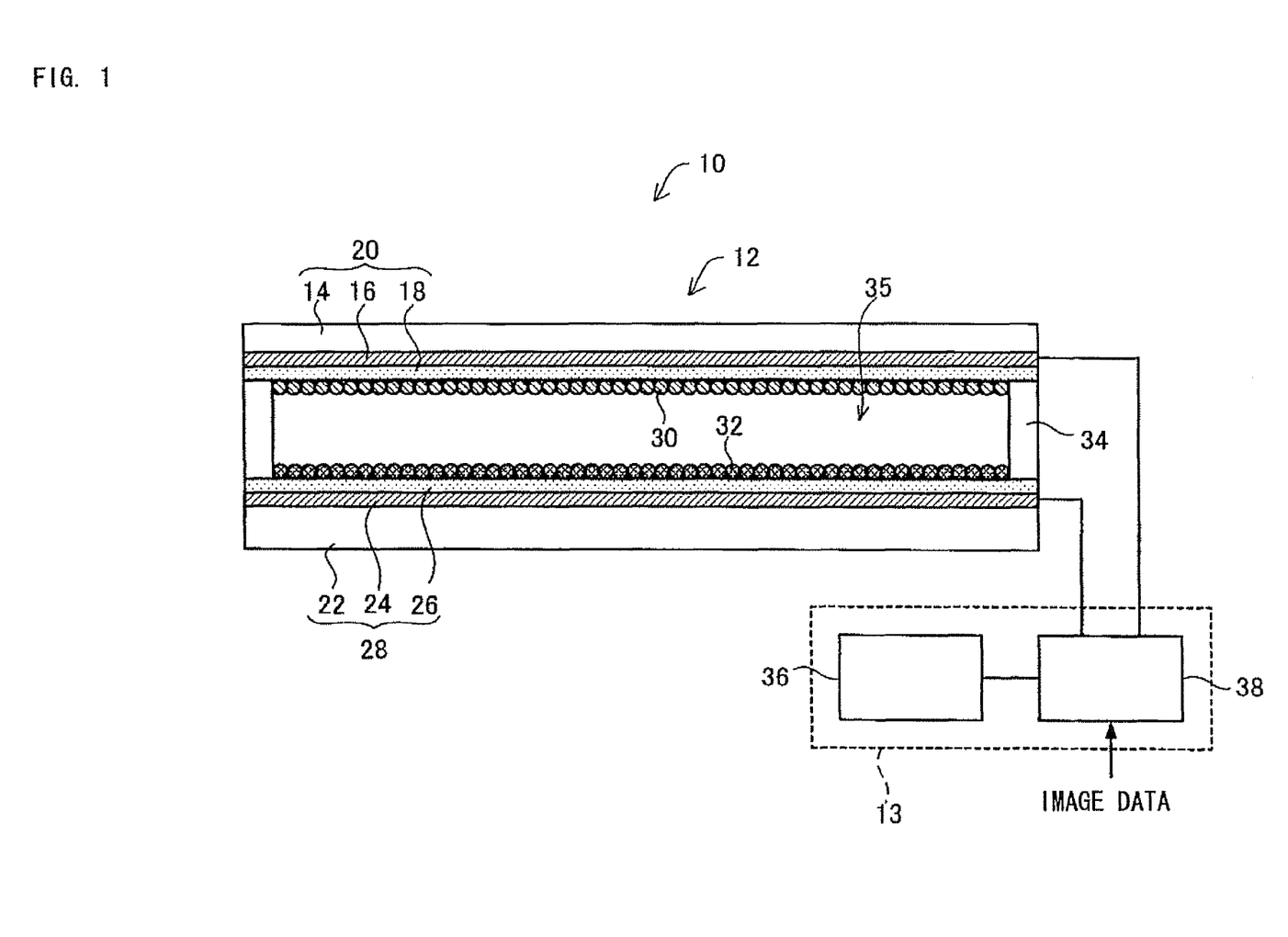
FIG. 1 is a schematic configurational drawing of an image display device according to a first embodiment of the invention.

FIG. 1 shows a schematic configuration of an image display device 10 according to a first embodiment of the invention. The image display device 10 includes an image display medium 12 and a drive device 13.

The image display medium 12 includes a display substrate 20 formed by laminating a display-side electrode 16 and a display-side charge-retention layer 18 on a transparent substrate 14, and a backside substrate 28 formed by laminating a backside electrode 24 and a backside charge-retention electrode 26 on a substrate 22, plural kinds of particles including positively charged first particles 30 and negatively charged second particles 32 that are enclosed between the substrates, and spacers 34 provided between the substrates.

In this embodiment, explanation will be given on the condition that the color of the first particles 30 is cyan and the color of the second particles 32 is magenta, but the combination of colors is not restricted to this embodiment. The first and second particles may have polarities that are opposite to each other. Electrically insulating particles or electroconductive particles may be used for these particles.

Each of the display-side charge-retention layer 18 and the backside charge-retention layer 26 retains a negative charge. As the charge-retention layer, for example, an electret layer, an ionic polymer layer, or the like may be used.

Each electrode is formed from ITO (indium tin oxide), for example. Further, in this embodiment, each electrode is provided within the display substrate 20 and the backside substrate 28, but they may be separately provided outside of the display substrate 20 and the backside substrates 28, respectively. When electrodes are provided separately from the image display medium, an electric field can be generated between the substrates by forming each substrate from a member having a dielectric property.

As the member that constitutes the image display medium 10, for example, those described in JP-A No. 2001-312225 may be used.

In this embodiment, the space 35 between the substrates is described as being filled with a gas, but the space may be filled with a light-transmissive liquid such as a transparent liquid.

The drive device 13 includes a storage unit 36 that stores threshold voltage characteristic information including a movement initiation voltage at which the first and second particles 30 and 32 start moving from one substrate side to the other substrate side, and a movement termination voltage at which movement of the particles from one substrate side to the other substrate side stops, and a voltage-application unit 38 that applies a voltage between the display-side electrode 16 and the backside electrode 24 by setting the voltage to be applied in accordance with image data, based on the threshold voltage characteristic information. Here, the voltage to be applied refers to a voltage to be applied to the display-side electrode 16 with respect to the backside electrode 24.

Figure 2A:
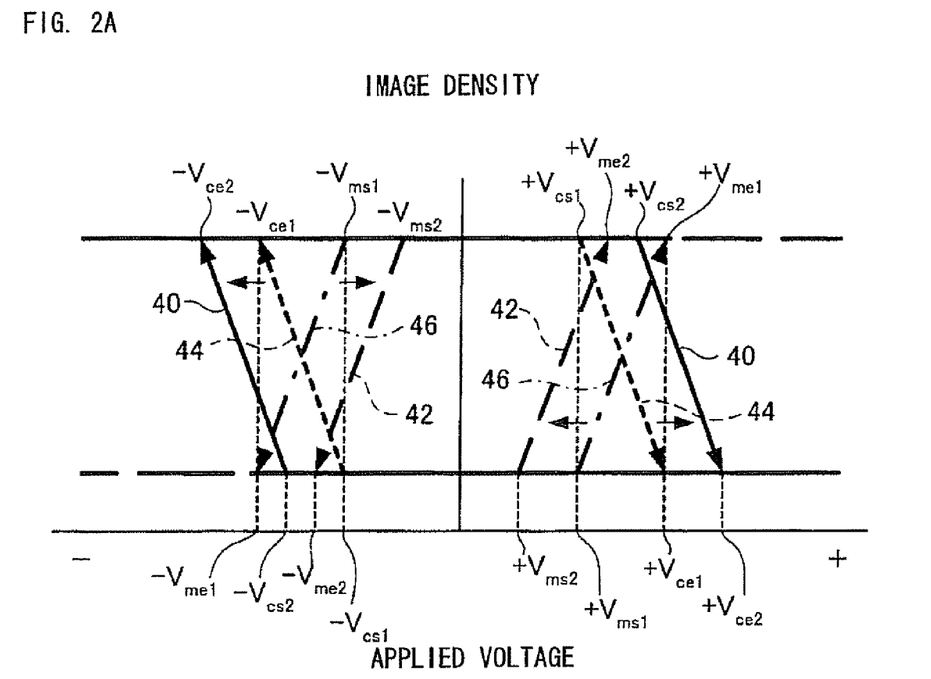
FIGS. 2A and 2B are diagrams showing threshold voltage characteristics of the particles.

FIG. 2A shows a threshold voltage characteristic 40 of the first particles 30 and a threshold voltage characteristic 42 of the second particles 32. Further, FIG. 2A shows a threshold voltage characteristic 44 of the first particles 30 and a threshold voltage characteristic 46 of the second particles 32 of a conventional case in which simple surface layers retaining no charge are provided at each substrate, rather than the display-side charge-retention layer 18 and the backside charge-retention layer 26. As shown in FIG. 2A, in the threshold voltage characteristics 44 and 46 of a conventional configuration, the movement initiation voltage and the movement termination voltage at which particles start or stop moving from the display from the side of substrate 20 to the side of backside substrate 28, and from the side of backside substrate 28 to the side of display substrate 20, show similar characteristics except that their polarities are different.

As shown in FIG. 2A, for example, with respect to the threshold voltage characteristics at the positive side, when a negatively charged display-side charge-retention layer 18 is provided to the image display medium 12 as with the case of the present embodiment, the movement initiation voltage at which positively charged first particles 30 start moving from the side of substrate 20 to the side of backside substrate 28 shifts to +Vcs2 from the movement initiation voltage +Vcs1 (when the display side charge-retention layer 18 is not provided), and the movement termination voltage shifts to +Vce2 from +Vce1. Namely, these voltages shift in a direction of increasing the level of a voltage to be applied. This is because a static electroattractive force is formed between the first particles 30 that are positively charged and the display-side charge-retention layer 18 that is negatively charged, and thus a larger voltage has to be applied in order to move the first particles 30 from the side of display substrate 20 to the side of backside substrate 28, as compared with the case where the display-side charge-retention layer 18 is not provided.

In a similar manner, in the case in which a negatively charged charge-retention layer is provided, the movement initiation voltage at which negatively charged second particles 32 start moving from the side of backside substrate 28 to the side of display substrate 20 shifts to +Vms2 from the movement initiation voltage +Vms1 (when the backside charge-retention layer 26 is not provided), and the movement termination voltage shifts to +Vme2 from +Vme1. Namely, these voltages shift in a direction of decreasing the applying voltage. This is because a repulsive force is formed between the second particles 32 that are negatively charged and the backside charge-retention layer 26 that is negatively charged, and thus the second particles 32 start moving from the side of backside substrate 28 to the side of display substrate 20 upon application of a smaller voltage, as compared with the case in which backside charge-retention layer 26 is not provided.

Further, the movement termination voltage of the second particles 32 (+Vme2) is lower than the movement initiation voltage of the first particles 30 (+Vcs2). Namely, the display-side charge-retention layer 18 and the backside charge-retention layer 26 serve as function layers that shift the threshold voltage characteristics 40 and 42 in order to prevent the threshold voltage characteristic 42, ranging from the movement initiation voltage of the second particles 32 (+Vms2) to the movement termination voltage of the second particles 32 (+Vme2), and the threshold voltage characteristic 40, ranging from the movement initiation voltage of the first particles 30 (+Vcs2) to the movement termination voltage of the first particles 30 (+Vce2), from overlapping with each other.

Similar changes occur in the characteristic of the applied voltage at the negative side. Namely, by providing the display-side charge-retention layer 18 and the backside charge-retention layer 26, the threshold voltage characteristic of the positively charged first particles 30 shift in a direction of increasing an absolute value of the applied voltage, and the threshold voltage characteristic of the negatively charged second particles 32 shift in a direction of decreasing an absolute value of the applied voltage.

Figure 2B:
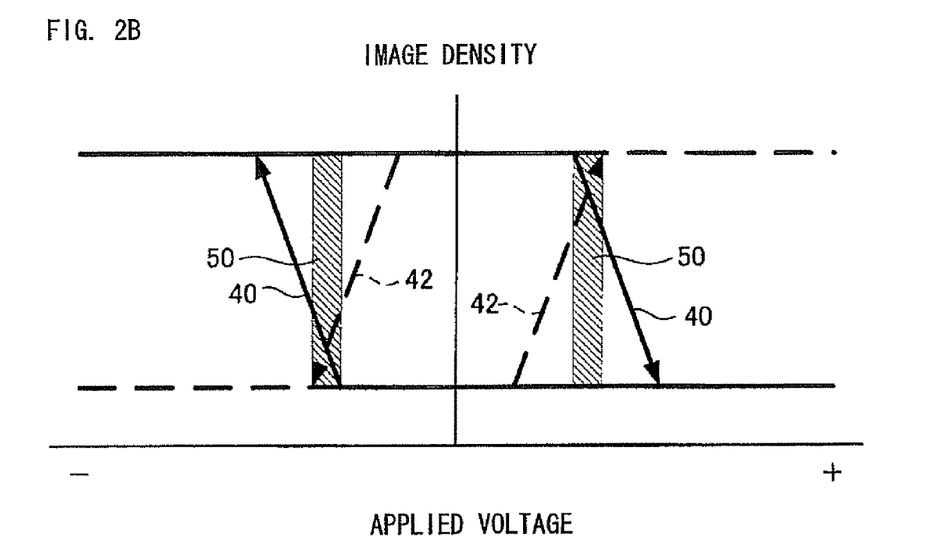

As shown in FIG. 2B, if an overlap portion 50 at which the threshold voltage characteristic 40 overlap with the threshold voltage characteristic 42 is formed, intermixing of colors occurs upon application of a voltage in a range corresponding to the overlap portion, thereby preventing proper display of a mixed color produced by the first and second particles 30 and 32.

Next, voltage-application sequences of the voltage-application unit 38 will be explained.

The voltage-application unit 38 sets an applied voltage in accordance with image data based on the threshold voltage characteristic information stored in the storage unit 36, and applies the voltage between the display-side electrode 16 and the backside electrode 24.

Figure 3:
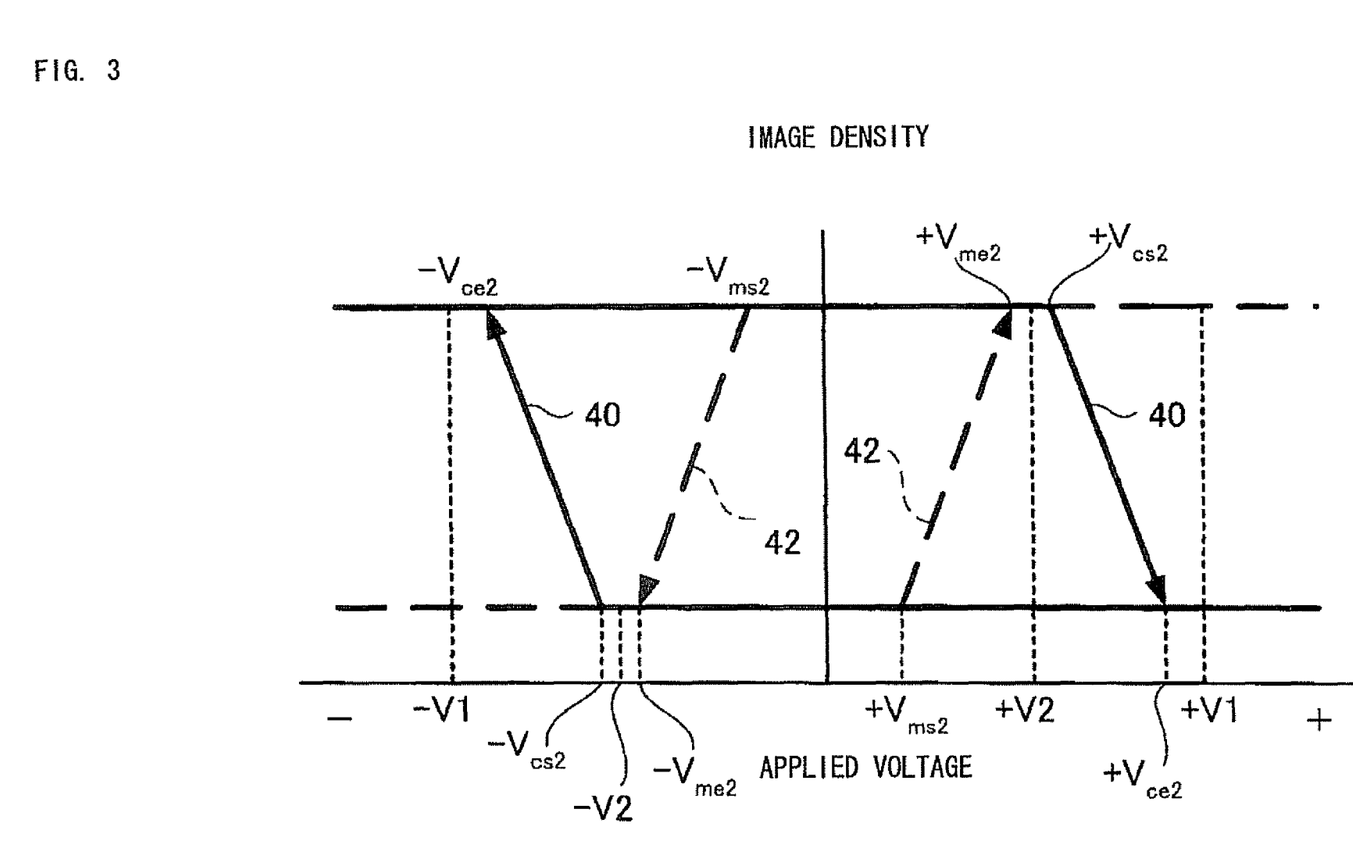
FIG. 3 is a diagram showing threshold voltage characteristics of the particles.

A first voltage-application sequence for displaying the cyan color of the first particles 30 will be explained. In displaying the color of the first particles 30, for example, as shown in FIG. 3, the voltage-application unit 38 applies a voltage −V1, which is lower than the movement termination voltage of the first particles 30 (−Vce2), between the electrodes. The first particles 30 at the side of backside substrate 28 are thus moved to the side of display substrate 20, and the second particles 32 at the side of display substrate 20 is moved to the side of backside substrate 28, thereby displaying the color of the first particles 30.

A second voltage-application sequence for displaying the magenta color of the second particles 32 will be explained. When displaying the color of the second particles 32, for example, as shown in FIG. 3, the voltage-application unit 38 applies a voltage +V1, which is higher than the movement termination voltage of the first particles 30 (+Vce2), between the electrodes. The second particles 32 at the side of backside substrate 28 are thus moved to the side of display substrate 20, and the first particles 30 at the side of display substrate 20 are moved to the side of backside substrate 28, thereby displaying the color of the second particles 32

A third voltage-application sequence for displaying a mixed color of the first particles 30 and the second particles 32, i.e., a blue color that is a mixed color of cyan and magenta, will be explained.

When displaying a mixed color of the first particles 30 and the second particles 32, first, the voltage-application unit 38 applies a voltage −V1 between the electrodes to display the color of the first particles 30. Subsequently, the voltage-application unit 38 applies a voltage +V2, which is equal to or more than the movement termination voltage of second particles 32 (+Vme2) and less than the movement initiation voltage of the first particles 30 (+Vcs2). In this manner, only the second particles 32 are moved to the side of display substrate 20, thereby displaying a mixed color of the first particles 30 and the second particles 32.

A fourth voltage-application sequence for displaying a gradation of a mixed color of the first particles 30 and the second particles 32 will be explained. The voltage-application unit 38 applies a voltage to display a mixed color in accordance with the aforementioned third voltage-application sequence, and in this state, further applies an arbitrary level of voltage that is equal to or more than the movement initiation voltage of the first particles 30 (+Vcs2) and less than the movement termination voltage of the first particles 30 (+Vce2). In this manner, the first particles 30 in an amount corresponding to the level of the applied voltage are moved to the side of backside substrate 28, thereby displaying a mixed color with gradation corresponding to the level of the applied voltage.

A fifth voltage-application sequence for displaying a mixed color with gradation of the first particles 30 and second particles 32 will be explained. The voltage-application unit 38 applies a voltage to display a mixed color in accordance with the aforementioned third voltage-application sequence, and in this state, further applies an arbitrary level of voltage that is equal to or less than the movement initiation voltage of the second particles 32 (−Vms2) and more than the movement termination voltage of the second particles 32 (−Vme2). In this manner, the second particles 32 of an amount corresponding to the level of the applied voltage are moved to the side of backside substrate 28, thereby displaying a mixed color with gradation corresponding to the level of the applied voltage.

Second Embodiment

Next, a second embodiment of the invention will be explained. Here, the same denotations will be given to the portions identical to the first above embodiment, and detailed explanations thereof will be omitted.

In this embodiment, an image display medium will be explained in which a liquid having a different color from those of the particles is present between the substrates.

Figure 4:
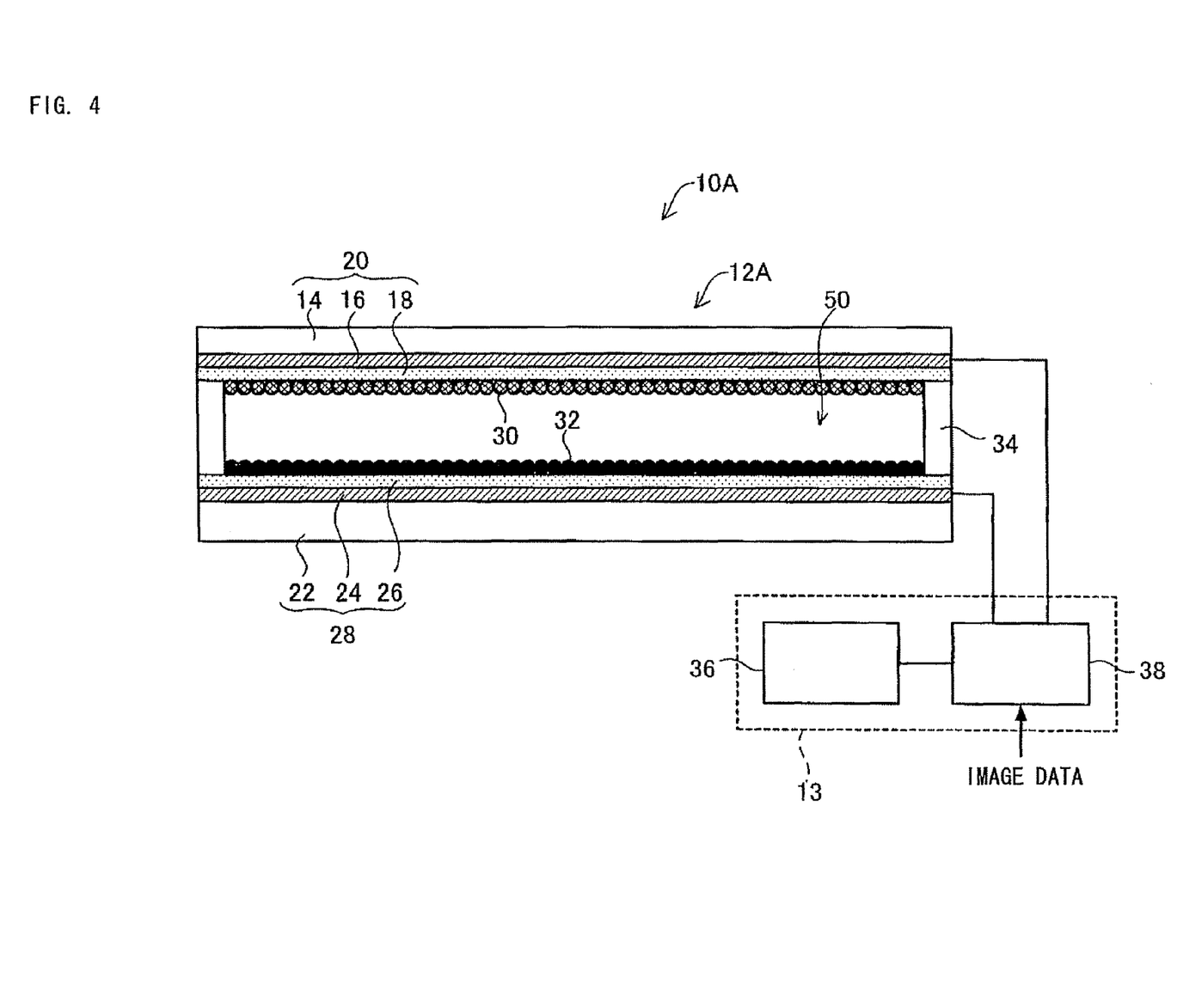
FIG. 4 is a schematic drawing of an image display device according to a second embodiment of the invention.

FIG. 4 shows a schematic configuration of an image display device 10A according to this embodiment. The image display device 10A is provided with an image display medium 12A. The image display medium 12A differs from the image display medium 12 in FIG. 1 in that a liquid 50 having a different color from those of the first particles 30 and the second particles 32 is present between the display substrate 20 and the backside substrate 28, together with the first particles 30 and the second particles 32. In this embodiment, the colors of the liquid 50, first particles 30 and second particles 32 are described as white, red and black, respectively, but the combination of colors is not limited thereto. Further, in this embodiment, the threshold voltage characteristics of the first particles 30 and the second particles 32 are described as being similar to those shown in FIG. 2.

When displaying the red color of the first particles 30, the voltage-application unit 38 applies a voltage in accordance with the first voltage-application sequence as described above.

When displaying the black color of the second particles 32, the voltage-application unit 38 applies a voltage in accordance with the second voltage-application sequence as described above.

A sixth voltage-application sequence for displaying the color of liquid 50, namely white color, will be explained. When displaying the color of the liquid 50, the voltage-application unit 38 applies a voltage +V1 as shown in FIG. 3 between the electrodes to move the first particles 30 to the side of backside substrate 28 and move the second particles group 32 to the side of display substrate 20. Thereafter, a voltage −V2 is applied between the electrodes to move only the second particles 32 to the side of backside substrate 28, thereby positioning both of the first and second particles to the side of backside substrate 28 to display the color of the liquid 50.

Third Embodiment

In the following, a third embodiment of the invention will be explained. Here, the same denotations will be given to the portions identical to the above embodiments, and detailed explanations thereof will be omitted.

In this embodiment, an image display medium is described as having a porous layer through which particles can pass provided between the substrates.

Figure 5:
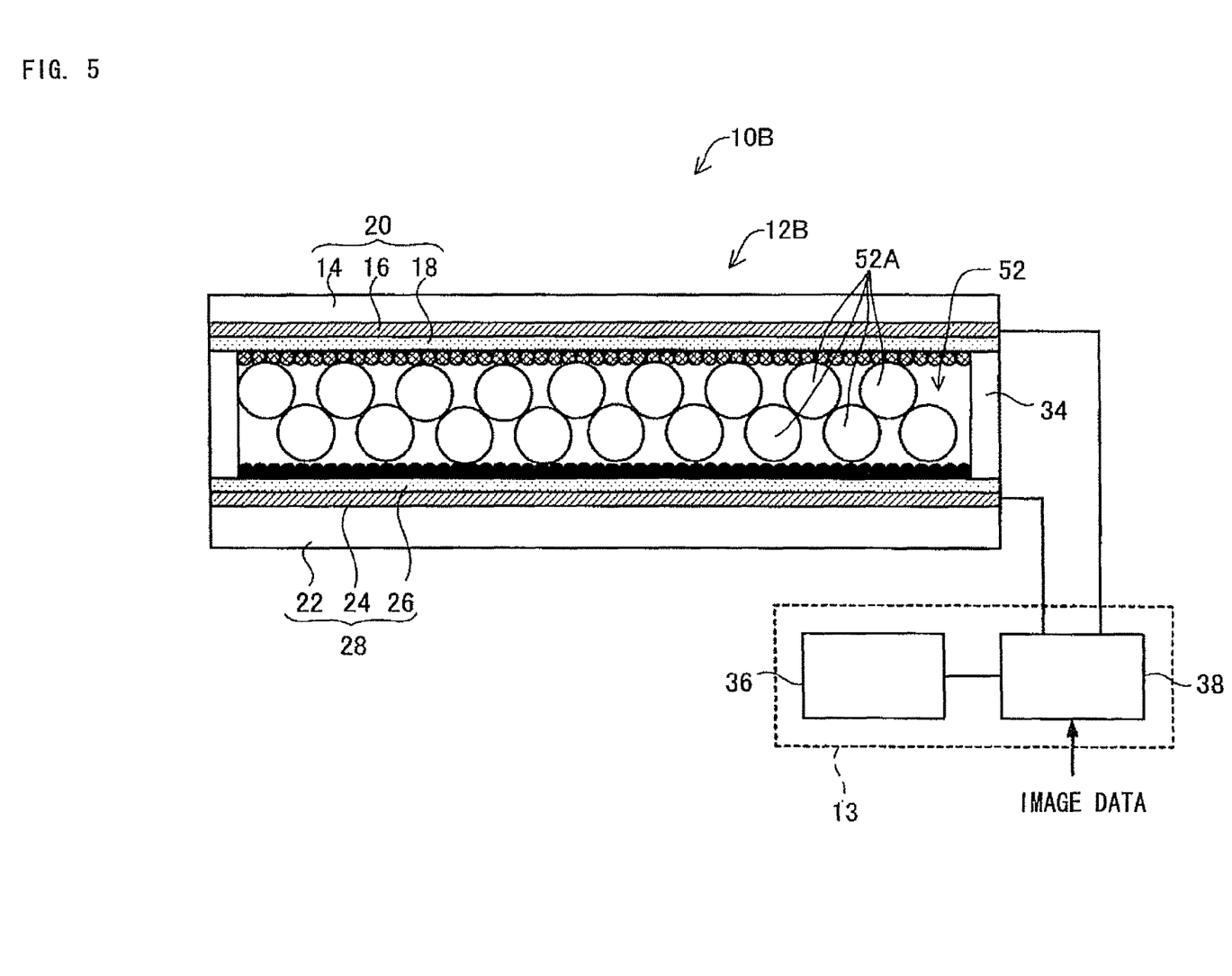
FIG. 5 is a schematic drawing of an image display device according to a third embodiment of the invention.

FIG. 5 shows a schematic configuration of an image display device 10B according to this embodiment. The image display device 10B has an image display medium 12B. This image display medium 12B differs from the image display medium 12A in FIG. 4 in that a porous member 52 having a different color from those of the first particles 30 and the second particles 32 is provided between the display substrate 20 and the backside substrate 28 in the image display medium 12B, rather than a liquid 50. In this embodiment, the color of the porous member 52 is described as white, but the combination of the color of the porous member 52 and the color of the particles is not limited to this combination.

As shown in FIG. 5, the porous member 52 has a configuration in which plural particles 52A having a larger diameter than the first particles 30 and the second particles 32 are arranged in a direction almost perpendicular to the direction in which the display substrate 20 and the backside substrate 28 face with each other, and are connected to the display substrate 20 and the backside substrate 28. Further, the particles 52A positioned next to each other form voids (or holes) through which the first particles 30 and the second particles 32 can move.

The voltage-application sequence of the voltage-application unit 38 in this embodiment is similar to that of the second embodiment. Namely, when displaying the red color of the first particles 30, the voltage-application unit 38 applies a voltage in accordance with the first voltage-application sequence, and when displaying the black color of the second particles 32, the voltage-application unit 38 applies a voltage in accordance with the second voltage-application sequence.

Further, when displaying the white color of the porous member 52, the voltage-application unit 38 applies a voltage in accordance with the sixth voltage-application sequence. In this case, the particles move between the substrates through the holes in the porous member 52.

In the above explanation, the porous member 52 is formed from plural particles 52A having a large diameter, but the configuration is not limited thereto and the porous member 52 may be formed from a tabular member having a number of holes through which the first particles 30 and the second particles 32 can move. In this case, the color of at least a display substrate-side of the tabular member should be different from the colors of the first particles 30 and the second particles 32.

In each of the above embodiments, it is possible that the first particles 30 and the second particles 32 are light-transmissive and the colors thereof are in a complementary color relationship. For example, it is possible to design the color of the first particles 30 to be green and the color of the second particles 32 to be magenta. In this case, a black color, which is a mixed color of green and magenta, can be displayed by applying a voltage by the voltage-application unit 38 in accordance with the third voltage-application sequence. Similar combination of the colors include a combination of the color of the first particles 30 being cyan and the color of the second particles 32 being red, and a combination of the color of the first particles 30 being blue and the color of the second particles 32 being yellow.

Fourth Embodiment

Next, a fourth embodiment of the invention will be explained. Here, the same denotations will be given to the portions identical to the above embodiments, and detailed explanations thereof will be omitted.

In this embodiment, the image display medium has a configuration in which plural kinds of particles having larger diameters than those of the first particles 30 and the second particles 32 are positioned between the substrates, in addition to the first particles 30 and the second particles 32. Alternatively, a gas or a liquid may be positioned between the substrates, instead of particles.

Figure 6:
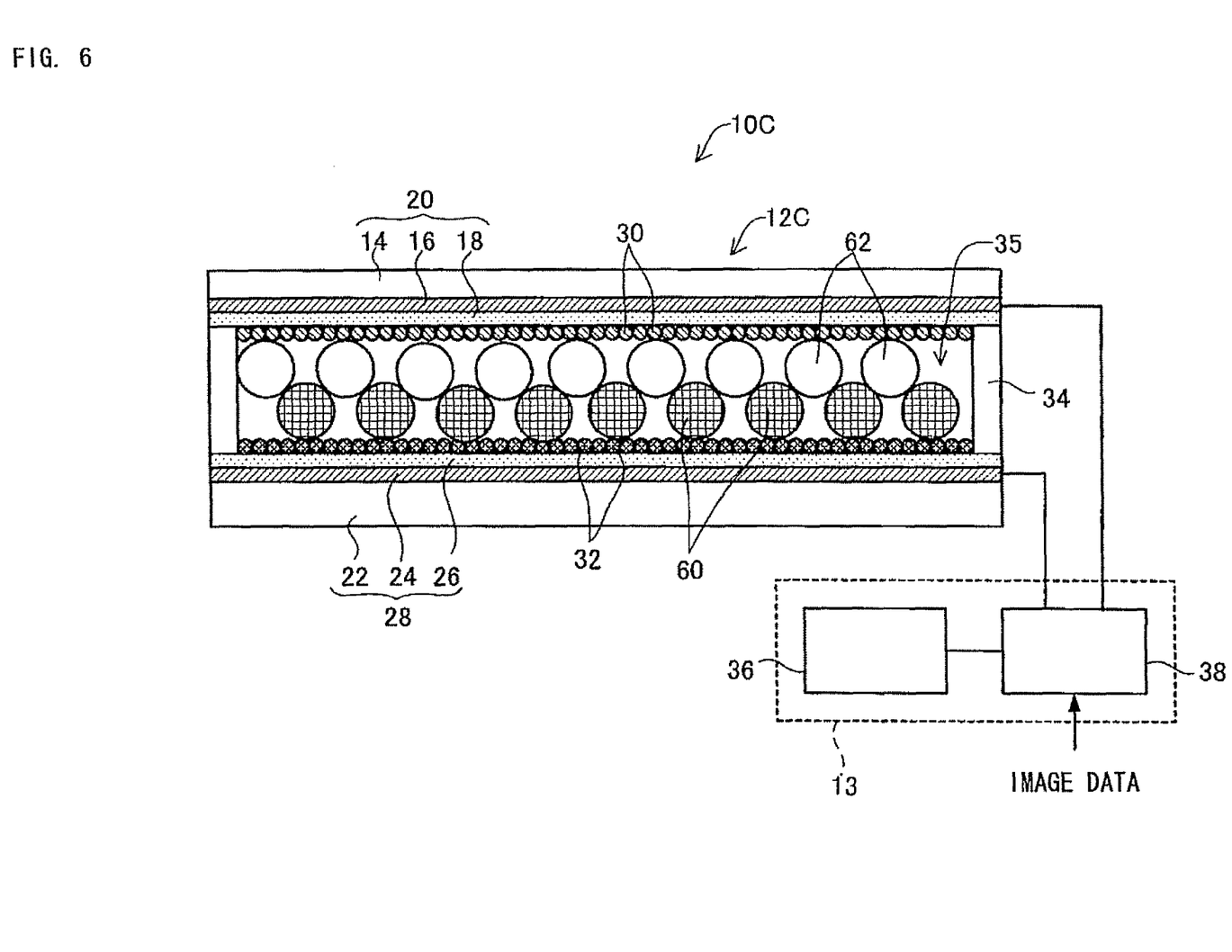
FIG. 6 is a schematic drawing of an image display device according to a fourth embodiment of the invention.

FIG. 6 shows a schematic configuration of an image display device 10C according to this embodiment. The image display device 10C has an image display medium 12C. The image display medium 12C differs from the image display medium 12 in FIG. 1 in that the medium includes negatively charged first large-diameter particles 60 and positively charged second large-diameter particles 62, both of which having a diameter larger than the first and second particles 30 and 32, between the display substrate 20 and the backside substrate 28, and that the first and second particles 30 and 32 are light-transmissive. In this embodiment, the color of the first large-diameter particles 60 is described as yellow and the color of the second large-diameter particles 62 is described as white.

Figure 7:
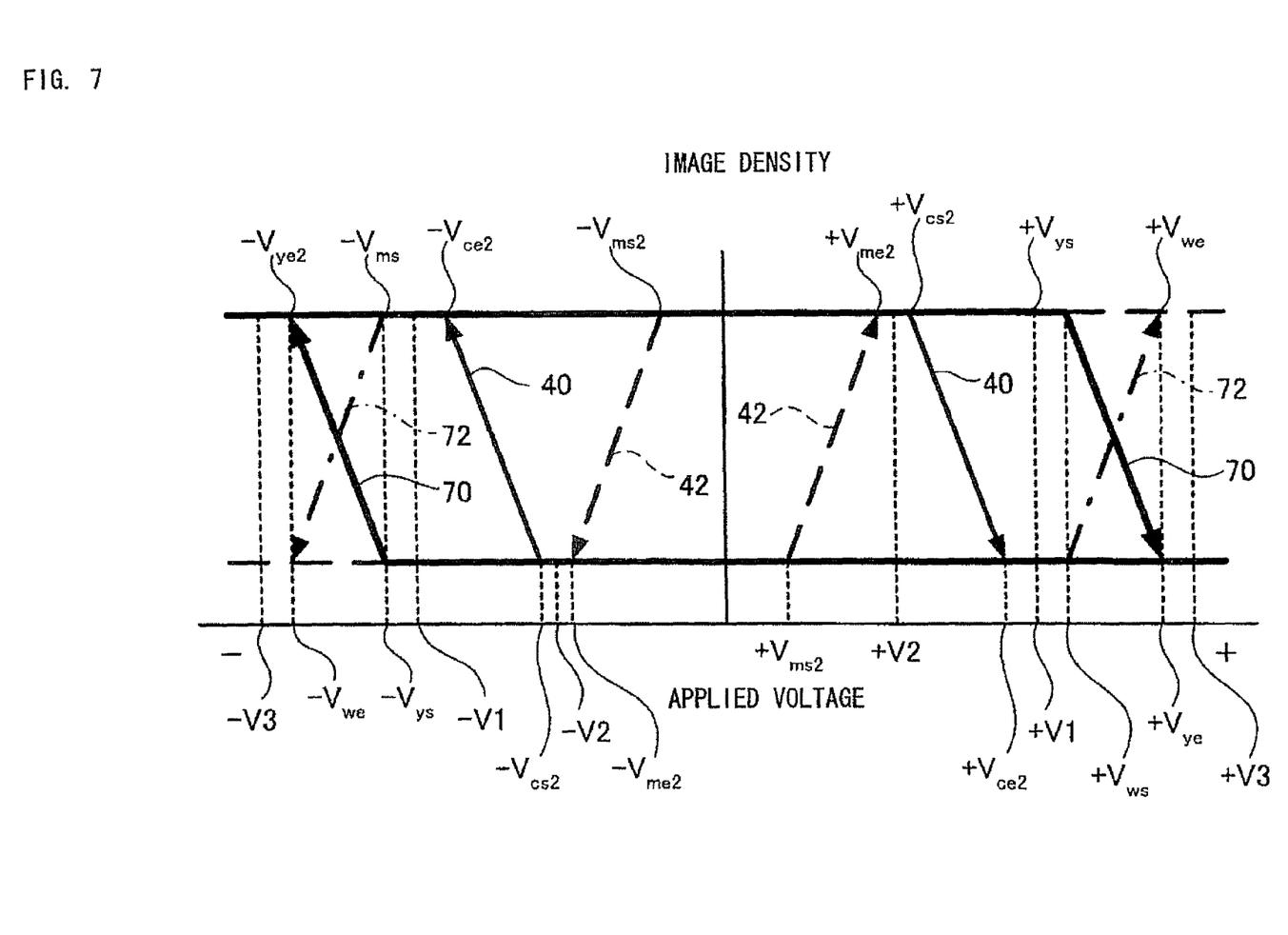
FIG. 7 is a diagram showing threshold voltage characteristics of the particles.

FIG. 7 shows a threshold voltage characteristic 70 of the first large-diameter particles 60 and a threshold voltage characteristic 72 of the second large-diameter particles 62.

In this case, when a voltage +V3, which is higher than a movement termination voltage of the second large-diameter particles 62 (+Vwe), is applied by the voltage-application unit 38, the negatively charged second particles 32 and the second large-diameter particles 62 are moved to the side of display substrate 20, and a magenta color is displayed. In this case, the second large-diameter particles 62 with a white color function as a reflecting layer.

When a voltage −V2 is applied by the voltage-application unit 38 to the image display medium displaying a magenta color, the negatively charged second particles 32 are moved to the side of backside substrate 28 side, and a white color is displayed.

When a voltage −V1 is applied by the voltage-application unit 38 to the image display medium displaying a magenta color, the negatively charged second particles 32 are moved to the side of backside substrate 28 and the positively charged first particles 30 are moved to the side of display substrate 20, and a cyan color is displayed.

When a voltage −V1 is applied by the voltage-application unit 38 to the image display medium displaying a white color, and then a voltage +V2 is applied, the first particles 30 and the second particles 32 are eventually moved to the side of display substrate 20 and a blue color that is a mixed color of cyan and magenta is displayed.

When a voltage −V3, which is lower than a movement termination voltage of the first large-diameter particles 60 (+Vye), is applied by the voltage-application unit 38, the positively charged first particles 30 and the first large-diameter particles 60 are moved to the side of display substrate 20, and a green color that is a mixed color of cyan and yellow is displayed.

When a voltage +V2 is applied by the voltage-application unit 38 to the image display medium displaying a green color, the negatively charged second particles 32 are moved to the side of backside substrate 28, and a black color that is a mixed color of green and magenta is displayed.

When a voltage +V1 is applied by the voltage-application unit 38 to the image display medium displaying a green color, the positively charged first particles 30 are moved to the side of backside substrate 28 and the negatively charged second particles 32 are moved to the side of display substrate 20, and a red color that is a mixed color of yellow and magenta is displayed.

When a voltage +V1 is applied by the voltage-application unit 38 to the image display medium displaying a green color, and then a voltage −V2 is applied, the first particles 30 and the second particles 32 are eventually moved to the side of backside substrate 28, and a yellow colors is displayed.

It is also possible to display a gradation of color by moving only the first particles 30 or only the second particles 32, as with the case described in the first embodiment. Displaying a gradation of color of the first large-diameter particles 60 and the second large-diameter particles 62 (gradation of yellow) can be achieved by controlling the application of a voltage to the range of from +Vws (+Vys) to +Vwe (+Vye), and to the range of from −Vws (−Vys) to −Vwe (−Vye), within which the first large-diameter particles 60 and the second large-diameter particles 62 can move.

In each of the above embodiments, the charge-retention layer is provided at each of the display substrate 20 and the backside substrate 28. However, it is also possible that a charge-retention layer is provided at only one of these substrates to shift the threshold voltage characteristic of either one of the first and second particles, thereby avoiding overlapping of the threshold voltage characteristics of the first and second particles, as shown in FIG. 2A.

Moreover, in each of the above embodiments, the charge-retention layer is described as retaining a negative charge. However, it is also possible that the charge-retention layer retains a positive charge. In this case, the direction in which the threshold voltage characteristic shifts is opposite to the direction shown in FIG. 2A, but it is possible as long as the threshold voltage characteristics of the first and second particles do not overlap with each other, within such a range that a memory function of the particles can be maintained.

All publications, patent applications, and technical standards mentioned in this specification are herein incorporated by reference to the same extent as if each individual publication, patent application, or technical standard was specifically and individually indicated to be incorporated by reference.

What is claimed is:

1. An image display medium comprising:
   a pair of substrates, at least one of which is light-transmissive;
   two or more kinds of particles, including a first kind of particle and a second kind of particle, having different colors and charge polarities, the particles being positioned between the pair of substrates such that the particles can move in response to an electric field generated between the pair of substrates; and
   an electric charge-retention layer that retains a positive or negative charge, is provided at a side of each of the pair of substrates, and maintains the same polarity at each of the pair of substrates,
   wherein the electric charge-retention layer retains the positive or negative charge and is provided at the side of at least one of the pair of substrates so that an absolute value of a voltage at which the first kind of particle terminates movement from a side of a first substrate of the pair of substrates towards a side of a second substrate of the pair of substrates is smaller than an absolute value of a voltage at which the second kind of particle initiates movement from the side of the second substrate towards the side of the first substrate, and an absolute value of a voltage at which the first kind of particle terminates movement from the side of the second substrate towards the side of the first substrate is smaller than an absolute value of a voltage at which the second kind of particle initiates movement from the side of the first substrate towards the side of the second substrate.

2. The image display medium according to claim 1, wherein a gas or a liquid is present between the pair of substrates.

3. The image display medium according to claim 2, wherein a liquid having a different color from the colors of the two or more kinds of particles is present between the pair of substrates.

4. The image display medium according to claim 1, wherein the colors of at least two kinds of particles among the two or more kinds of particles are in a complementary color relationship.

5. The image display medium according to claim 1, wherein a porous member having a plurality of holes through which the two or more kinds of particles can pass and having a different color from the colors of the two or more kinds of particles, is provided between the pair of substrates.

6. The image display medium according to claim 5, wherein the porous member comprises particles having a diameter larger than the diameters of the two or more kinds of particles.

7. The image display medium according to claim 1, further comprising a pair of electrodes that apply a voltage between the pair of substrates.

8. A drive device for the image display medium according to claim 1, comprising:
 a storage unit that stores information regarding threshold voltage characteristics of the two or more kinds of particles; and
 a voltage-application unit that sets a voltage to be applied corresponding to inputted image data based on the information regarding the threshold voltage characteristics stored in the storage unit, and applies a voltage between the pair of substrates of the image display medium.

9. An image display device including:
 an image display medium comprising
  a pair of substrates, at least one of which is light-transmissive,
  two or more kinds of particles, including a first kind of particle and a second kind of particle, having different colors and charge polarities, the particles being positioned between the pair of substrates such that the particles can move in response to an electric field generated between the pair of substrates, and
  an electric charge-retention layer that retains a positive or negative charge, is provided at a side of each of the pair of substrates, and maintains the same polarity at each of the pair of substrates;
 a storage unit that stores information regarding threshold voltage characteristics of the two or more kinds of particles; and
 a voltage-application unit that sets a voltage to be applied corresponding to inputted image data based on the information regarding the threshold voltage characteristics stored in the storage unit, and applies a voltage between the pair of substrates of the image display medium,
 wherein the electric charge-retention layer retains the positive or negative charge and is provided at the side of at least one of the pair of substrates so that an absolute value of a voltage at which the first kind of particle terminates movement from a side of a first substrate of the pair of substrates towards a side of a second substrate of the pair of substrates is smaller than an absolute value of a voltage at which the second kind of particle initiates movement from the side of the second substrate towards the side of the first substrate, and an absolute value of a voltage at which the first kind of particle terminates movement from the side of the second substrate towards the side of the first substrate is smaller than an absolute value of a voltage at which the second kind of particle initiates movement from the side of the first substrate towards the side of the second substrate.

10. The image display device according to claim 9, wherein a gas or a liquid is present between the pair of substrates.

11. The image display device according to claim 10, wherein a liquid having a different color from the colors of the two or more kinds of particles is present between the pair of substrates.

12. The image display device according to claim 9, wherein the colors of at least two kinds of particles among the two or more kinds of particles are in a complementary color relationship.

13. The image display device according to claim 9, wherein a porous member having a plurality of holes through which the two or more kinds of particles can pass and having a different color from the colors of the two or more kinds of particles, is provided between the pair of substrates.

14. The image display device according to claim 13, wherein the porous member comprises particles having a diameter larger than the diameters of the two or more kinds of particles.

15. The image display device according to claim 9, further comprising a pair of electrodes that apply a voltage between the pair of substrates.

* * * * *